(12) United States Patent
Zakoji et al.

(10) Patent No.: US 7,690,798 B2
(45) Date of Patent: Apr. 6, 2010

(54) PROJECTOR WITH EXTENDIBLE SCREEN MEMBER

(75) Inventors: Makoto Zakoji, Shiojiri (JP); Kunihiko Takagi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 725 days.

(21) Appl. No.: 11/550,247

(22) Filed: Oct. 17, 2006

(65) Prior Publication Data

US 2007/0091278 A1 Apr. 26, 2007

(30) Foreign Application Priority Data

Oct. 24, 2005 (JP) ............................. 2005-308287

(51) Int. Cl.
- G03B 21/14 (2006.01)
- G03B 21/22 (2006.01)
- G03B 21/16 (2006.01)
- G03B 21/18 (2006.01)
- H04N 5/74 (2006.01)

(52) U.S. Cl. ............................. 353/79; 353/52; 353/74; 348/749

(58) Field of Classification Search ............. 353/30–31, 353/52, 54, 69–80, 85, 119, 122; 348/748–749; 359/443, 461, 845; 356/3, 3.01, 3.1, 3.13, 356/4.01, 5.01

See application file for complete search history.

(56) References Cited

U.S. PATENT DOCUMENTS

| | | | | |
|---|---|---|---|---|
| 3,649,113 A | * | 3/1972 | Harvey | 353/101 |
| 5,392,081 A | * | 2/1995 | Tarnay et al. | 353/119 |
| 6,805,446 B2 | * | 10/2004 | Arai et al. | 353/61 |
| 7,125,122 B2 | * | 10/2006 | Li et al. | 353/31 |
| 7,341,188 B2 | * | 3/2008 | Aiki et al. | 235/454 |
| 7,384,152 B2 | * | 6/2008 | Takeuchi | 353/54 |
| 2003/0081184 A1 | | 5/2003 | Li et al. | |
| 2005/0219471 A1 | * | 10/2005 | Kitabayashi | 353/54 |
| 2006/0234784 A1 | * | 10/2006 | Reinhorn | 455/575.1 |
| 2007/0013873 A9 | * | 1/2007 | Jacobson et al. | 353/30 |
| 2007/0091276 A1 | * | 4/2007 | Zakoji et al. | 353/54 |

FOREIGN PATENT DOCUMENTS

| | | |
|---|---|---|
| JP | A-57-30826 | 2/1982 |
| JP | A-63-170633 | 7/1988 |
| JP | A 5-40301 | 2/1993 |
| JP | A-2001-343708 | 12/2001 |
| JP | A-2003-330108 | 11/2003 |

* cited by examiner

Primary Examiner—Georgia Y Epps
Assistant Examiner—Jori S Byrne-Diakun
(74) Attorney, Agent, or Firm—Oliff & Berridge, PLC

(57) ABSTRACT

A protector includes a projector body which has an image display unit which displays an image, a member to be projected onto which an image emitted from the image display unit is to be projected, and a connecting part capable of holding the member to be projected and the projector body at a predetermined distance therebetween and capable of accommodating the member to be projected within the projector body. The member to be projected can be unfolded in an in-plane direction.

6 Claims, 6 Drawing Sheets

PROJECTOR WITH EXTENDIBLE SCREEN MEMBER

BACKGROUND

1. Technical Field

The present invention relates to a projector.

2. Related Art

In recent years, a compact, lightweight, and bright projector into which a screen is integrated is proposed (for example, refer to JP-A-5-40301 (Patent Document 1). An image information enlarging display device described in Patent Document 1 is composed of a body-side container which accommodates an image information enlarging display unit having a projection unit, and a lid having a transmissive screen. This configuration allows an image projected from the projection unit to be enlarged and displayed onto the transmissive screen.

However, in the image information enlarging display device described in Patent Document 1, since the screen is provided on the side of the lid, the size of the screen will be determined depending on the size of a projector body. Thus, if the projector body is made compact, the size of the screen will also become small. Therefore, there is a problem in that a need to view an image on a large screen cannot be met.

SUMMARY

An advantage of some aspects of the invention is that it provides a projector which is compact, excellent in portability, and capable of viewing an image on a large screen.

According to an embodiment of the invention, there is provided a projector including: a projector body which has an image display unit which displays an image; a member to be projected onto which an image emitted from the image display unit is to be projected; and a connecting part capable of holding the member to be projected and the projector body at a predetermined distance therebetween and capable of accommodating the member to be projected within the projector body. The member to be projected can be unfolded in an in-plane direction.

In the projector according to the embodiment of the invention, when an image is projected by the image display unit the member to be projected can be unfolded and extended after the member to be projected is disposed at a predetermined distance from the projector body by the connecting part. Since this makes the member to be projected larger than the size of the projector body, even if the projector body is miniaturized, a larger image than the projector body can be projected onto the member to be projected during projection. Further, since the member to be projected can be accommodated within the projector body by the connecting part, it is possible to provide a compact projector with excellent portability. Further, since the work of installing the member to be projected can be omitted, the projector can project an image in any places.

Further, preferably, the projector further includes a detector which detects the size of the member to be projected.

In the projector according to the embodiment of the invention, the detector detects an unfolded state of the member to be projected. Therefore, for example, in a case where the detector has detected that the member to be projected is not unfolded, a user can be informed of the fact that member to be projected is not unfolded. As a result, the user can unfold the member to be protected and thereby an image can be projected in the optimal state.

Further, preferably, the projector further include an image adjustor which adjusts the size of the image emitted from the image display unit according to the size of the member to be projected, which is detected by the detector.

In the projector according to the embodiment of the invention, when an image is projected by the image display unit, the size of the image is adjusted by the image adjustor and thereby an image suitable for the size of the member to be projected is projected onto the member to be projected if the detector has detected that the member to be projected is not unfolded. Further, when the member to be projected is unfolded, the size of the member to be projected is detected by the detector, and an image according to the size of the member to be projected at this time is projected on to the member to be projected. In this way, since the image adjustor automatically adjusts the size of an image according to the size of the member to be projected, which is detected by the detector, it is possible to display a proper size of an image simply.

Further, preferably, the projector further includes an illuminance adjustor which adjusts the illuminance of the image emitted from the image display unit according to the size of the member to be projected, which is detected by the detector.

In the projector according to the embodiment of the invention, when an image is projected by the image display unit, for example, an image whose illuminance has been dropped by the illuminance adjustor can be projected onto the member to be projected, if the detector has detected that the member to be protected is not unfolded. As such, the illuminance of an image is automatically adjusted when the member to be projected is small. Therefore, since the electric power of the projector body when the member to be projected is not unfolded, it is possible to achieve power saving.

Further, preferably, the member to be projected is provided with a heat radiating section which radiates the heat generated in the projector body.

In the projector according to the embodiment of the invention, when an image is projected by the image display unit, heat is generated from the projector body. Since the generated heat is radiated from the heat radiating section provided in the member to be projected, it is possible to achieve high cooling capability even if the projector body is small.

Further, preferably, a refrigerant flow passage through which a refrigerant can be circulated is formed inside the connecting part, and the refrigerant flow passage is connected with the heat radiating section.

In the projector according to the embodiment of the invention, when an image is projected by the image display unit, heat is generated from the projector body. This generated heat is transferred to a refrigerant and radiated by the heat radiating section through the refrigerant flow passage inside the connecting part. Accordingly, it is possible to cool the projector body with a compact configuration by causing a refrigerant to flow through the connecting part, and it is possible to improve heat exchange efficiency.

Further, preferably, the refrigerant is a liquid, and the liquid carries the heat generated in the projector body to the heat radiating section.

In the projector according to the embodiment of the invention, the heat generated in the projector body is carried to the heat radiating section by the liquid. That is, by using a liquid as the refrigerant, the generated heat can be carried efficiently and thus the cooling efficiency can be ensured sufficiently.

Further, preferably, a heat pipe which carries the heat generated in the projector body to the heat radiating section is provided within the refrigerant flow passage.

In the projector according to the embodiment of the invention, the heat generated in the projector body is carried to the heat radiating section by the heat pipe within the refrigerant flow passage. Accordingly, although a pump is required in a case where heat is carried using a refrigerant, such a pump can be omitted by using the heat pipe. Therefore, it is possible to reduce the size and cost of the whole apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
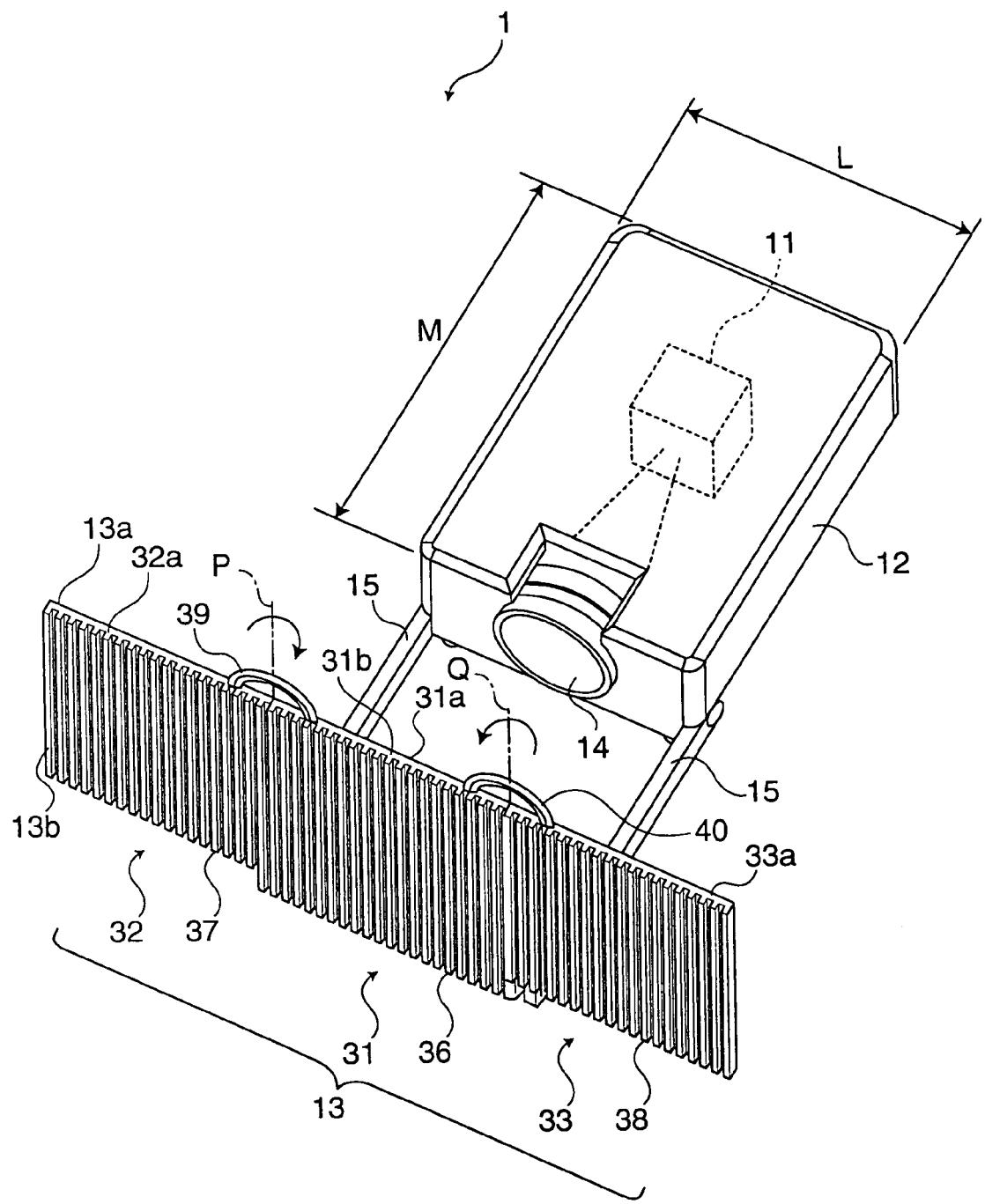
FIG. 1 is a top perspective view showing a projector according to a first embodiment of the invention.

Hereinafter, embodiments of the projector according to the embodiment of the invention will be described with reference to the accompanying drawings. In addition, scales of individual members in the drawings to be referred to below are appropriately changed so that each member can have a recognizable size.

Next, a first embodiment of the projector according to the embodiment of the invention will be described with reference to FIGS. 1 to 4.

Figure 2:
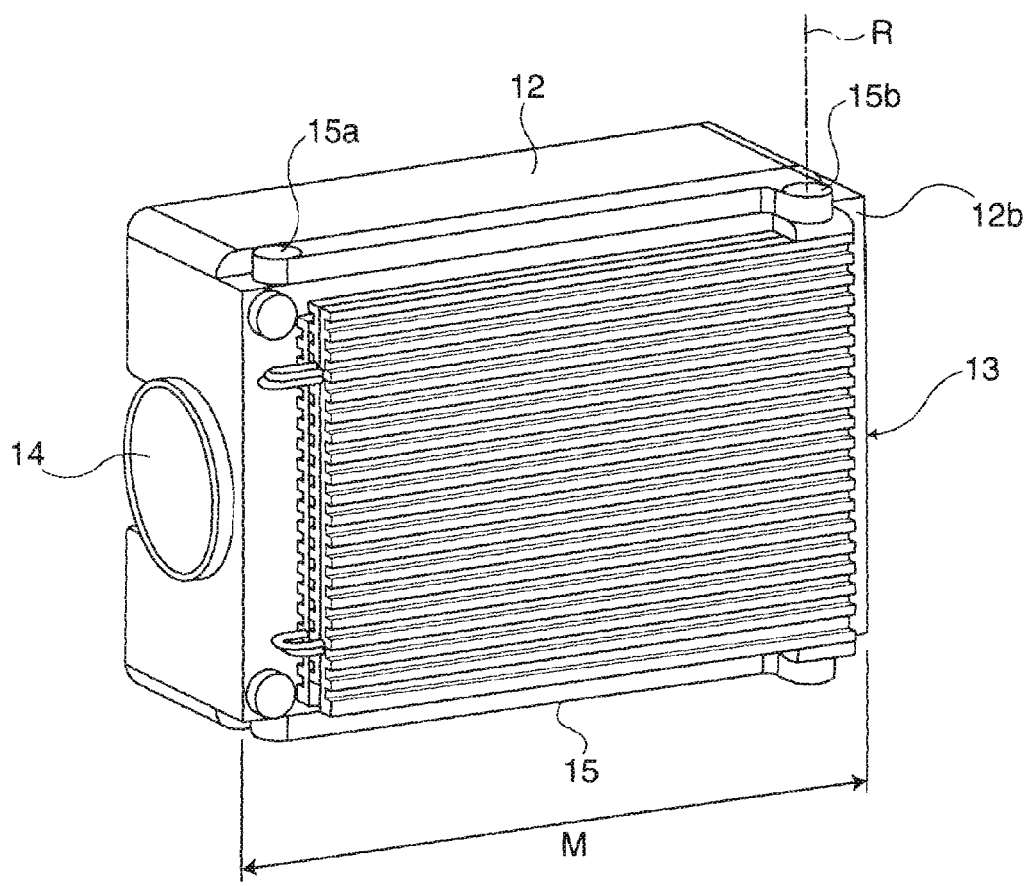
FIG. 2 is a bottom perspective view showing the projector according to the first embodiment of the invention.

FIG. 1 is a perspective view from the upper front side when the screen of a projector is unfolded, and FIG. 2 is a perspective view from the bottom side when the screen of a projector is accommodated.

The projector 1 is an optical instrument which modulates the light emitted from a light source according to image information, and enlarges the modulated image to project the enlarged image onto a reflective member to be projected, and includes a projector body 12 having an image display unit 11 including a light source, etc., a screen (a member to be projected, 13 onto which an image emitted from the image display unit 11 is to be projected, a projector lens 14 which is exposed from the projector body 12 to project an image onto the screen 13, a connecting part 15 which enables the screen 13 and the projector body 12 to be maintained at a predetermined distance therebetween and which enables the screen 13 to be accommodated in the projector body 12.

The screen 13 is composed of a first screen 31 which is disposed to face the projector lens 14 and has almost the same width as the width L of the projector body 12, and a second screen 32 and a third screen 33 which are provided on both sides of the first screen 31. The second screen 32 and the third screen 33 are rotatable by 180 degrees about an axis P of a hinge (not shown) which is provided between the first screen 31 and the second screen and an axis Q of a hinge (not shown) which is provided between the first screen and the third screen, from a surface 31a of the first screen 31 facing the projector lens 14. That is, when the screen 13 is accommodated, it is possible to fold up the second and third screens 32 and 33 onto the surface 31a of the first screen 31 about the axes P and Q.

In this way, the screen 13 is adapted such that the second screen 32 and the third screen 33 can be unfolded in the direction of the surface (face) 31a of the first screen 31.

Furthermore, first, second, and third heat radiating sections 36, 37, and 38 which radiate the heat generated in the projector body 12 are provided in the first, second, and third screens 31, 32 and 33, respectively, on the rear face 13b of the screen 13 opposite to the surface 13a thereof which faces the projector lens 14. Further, each of the heat radiating sections 36, 37, and 38 has a refrigerant flow passage (not shown) therein, and is formed with a plurality of fins.

Next, a flow passage through which a refrigerant passes will be described.

Figure 3:
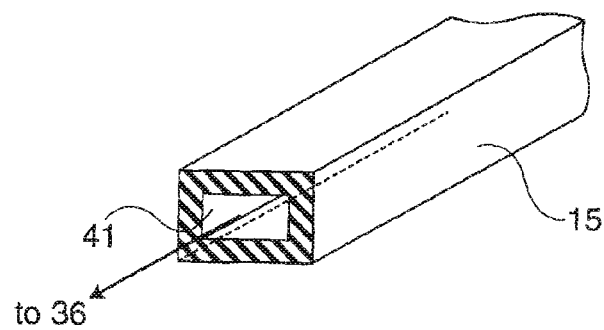
FIG. 3 is a sectional view of chief parts showing a refrigerant flow passage of a connecting part of FIG. 1.

As shout in FIG. 3, a refrigerant flow passage 41 through which a refrigerant can circulate is formed in the connecting part 15, and this refrigerant flow passage 41 and the refrigerant flow passage of the first heat radiating section 36 are connected with each other.

Further, the refrigerant flow passage of the first heat radiating section 36 and the refrigerant flow passage of the second heat radiating section 37 are connected together by a flexible tube 39 provided in the shape of an arch in an end face 31b of the first screen 31 and an end face 32a of the second screen 32. This flexible tube 39 allows a refrigerant to be carried the refrigerant flow passage of each of the heat radiating sections 36 and 37. As for the first heat radiating section 36 and the third heat radiating section 38, similarly, a flexible tube 40 is provided in an end face 31b of the first screen 31 and an end face 33a of the third screen 33 so as to allow a refrigerant to be carried to the refrigerant flow passage of each of the heat radiating sections 36 and 38.

Furthermore, the refrigerant flow passage 41 in the connecting part 15 is connected with a refrigerant flow passage which cools a light source, a liquid crystal light valve, a polarization converter, etc., which are provided in the projector body 12. This allows the heat generated inside the projector body 12 to pass through the refrigerant flow passage 41 and to exchange heat with the second and third heat radiating sections 37 and 38 via the first heat radiating section 36 and flexible tubes 39 and 40.

As shown in FIG. 2, the connecting part 15 is a rod-shaped member having almost the same length as a length M of the projector body. Further, two such connecting parts are provided on the rear face 12b of the projector body 12. One end 15a of this connecting part 15 is rotatably provided on the projector lens 14 side of the rear face 12b of the projector body 12, and the first screen 31 is provided at the other end 15b of the connecting part 15 so as to be rotatable about a vertical axis R with respect to the connecting part 15. That is, the connecting part 15 is adapted to be rotatable about 180 degrees about the one end 15a in the direction in which an image is projected by the projector lens 14 from the rear face 12b of the protector body 12, i.e., in the direction away from the projector body 12. This causes the connecting part 15 to be moved in the direction away from the projector body 12, so that the screen 13 and the projector body 12 can be separated from each other by about the length M of the connecting part 15.

Figure 4:
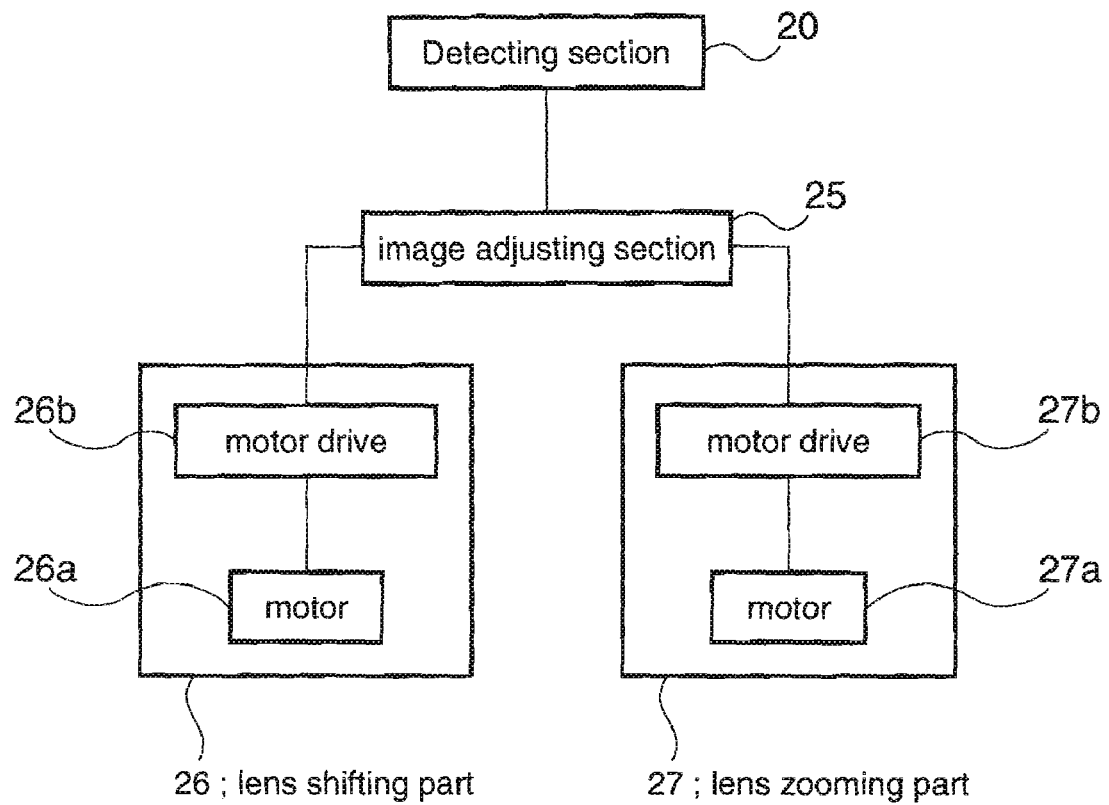
FIG. 4 is a block diagram showing a detector and an image adjustor of the projector of FIG. 1.

Further, as shown in FIG. 4, a detecting section (detector) 20 which detects the size of the screen 13 and an image adjusting section (image adjustor) 25 which adjusts the size of an image emitted from the image display unit 11 according to the size of the screen 13 detected by the detecting section 20 are provided inside the projector body 12. A lens shifting part 26 which adjusts an optical axis of the projector lens 14; and a zooming part 27 which adjusts the angle of view of an image projected on a screen 13 are provided in this image adjusting section 25.

This lens shifting part 26 includes a motor 26a which moves the projector lens 14 in a direction orthogonal to the optical axis, and a motor drive 26b which drives the motor 26a on the basis of a signal from the image adjusting section 25. Further, the zooming part 27 includes a motor 27a which moves the projector lens 14 along the optical axis, and a motor drive 27b which drives the motor 27a on the basis of a signal from the image adjusting section 25

Next, a method of projecting an image on the screen 13, using the projector 1 of this embodiment configured as above will be described.

First, when a light source inside the image display unit 11 is driver, an image enlarged by projector lens 14 is projected. Then, the connecting part 15 is moved in the direction away from the projector body 12 to unfold the second and third screens 32 and 33 about axes the P and Q. Then, the size of the screen 13 is detected by the detecting section 20, a signal is sent to the motor drive 26b of the lens shifting part 26 by the image adjusting section 25, and the projector lens 14 is moved in the direction orthogonal to the optical axis by the motor 26a so that the center position of an image may be the center position of the screen 13.

Further, a signal is also sent to the motor drive 27b of the zooming part 27 by the image adjusting section 25, and the projector lens 14 is moved along the optical axis by the motor 27a so that an image may has as the same size as the screen 13. Thus, an image having a size suitable for the screen 13 is projected by the image adjusting section 25 from the projector lens 14.

At this time; the heat generated from the projector body 12 is transferred to a refrigerant. The heat of this refrigerant is radiated through the refrigerant flow passage 41 of the connecting part 15 by the first, second, and third heat radiating sections 36, 37, and 38. Since a large current can be supplied to the projector body 12 by cooling the light source inside the projector body 12 by means of the heat radiating sections 36, 37, and 38, the image which is projected by the screen 13 will have a high luminance, and consequently a projector having excellent display properties can be provided.

In the projector 1 according to this embodiment, the screen 13 can be unfolded and become a larger screen 13 than the size of the protector body 12. Therefore, even if the projector body 12 is miniaturized, a larger image than the projector body 12 can be projected onto the screen 13 during projection. Further, since the screen 13 can be accommodated within the projector body 12 by the connecting part 15, it is possible to provide a compact projector with excellent portability. Further, since the work of installing the screen 13 can be omitted, the projector can project an image in any places.

Further, the provision of the image adjusting section 25 makes it possible to project an image, making maximum use of the size of the screen 13 while maintaining the aspect ratio of the image, and to project an image which is precise and easy to be viewed by an observer.

Figure 5:
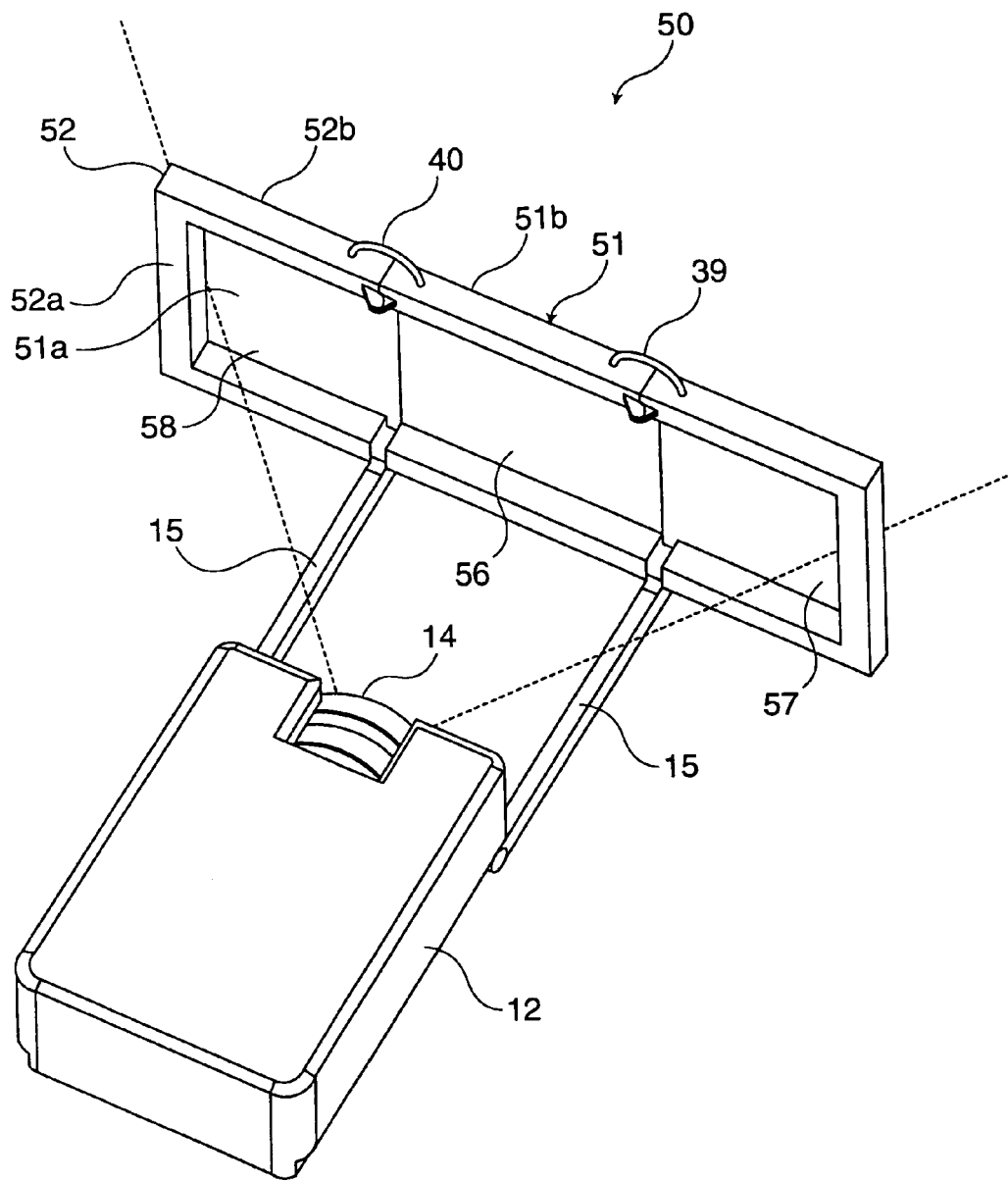
FIG. 5 is a top perspective view showing a projector according to a second embodiment of the invention.

Next, a second embodiment according to the invention will be described with reference to FIG. 5. In addition, in each of the embodiments to be described below, the components common to those of the projector 1 according to the above-described first embodiment will be denoted by the same reference numerals, and the description thereof will be omitted.

A projector 50 according to this embodiment is different from that of the first embodiment in that the reflective screen 13 is adopted in the first embodiment, whereas a transmissive screen 51 is adopted in the second embodiment.

The screen 51 is composed of a frame (heat radiating section) 52 supported by the connecting part 15, a first screen 56 adhered to a rear face 52b of this frame 52 opposite to a surface 52a thereof which faces the projector lens 14 and disposed to face the projector lens 14, and a second screen 57 and a third screen 58 provided on both sides of the first screen 56. Thereby, an image projected from the projector lens 14 is transmitted through the rear face 51a of the screen 51 which faces the projector lens 14 and emitted from the surface 51b opposite to the surface 51a.

This frame 52 has therein a flow passage (not shown) which communicates with the connecting part 15, and is made of a material having high thermal conductivity. This allows the refrigerant passed through the refrigerant flow passage 41 in the connecting part 15 to exchange heat in the frame 52.

In the projector 50 according to this embodiment; similar to the reflective screen, even if the projector body 12 is miniaturized, it is possible to obtain a larger screen 51 than the projector body 12. Further, since the screen 51 is of a transmission type and an observers shade is not reflected on the screen 51, it is possible to observe the screen from any position. Further, even in a bright place, it is possible to project a clear image onto the screen 51.

In addition, it should be understood that the technical scope of the invention is not limited to the above embodiments, but various modifications may be made without departing from the spirit and scope of the invention.

Figure 6:
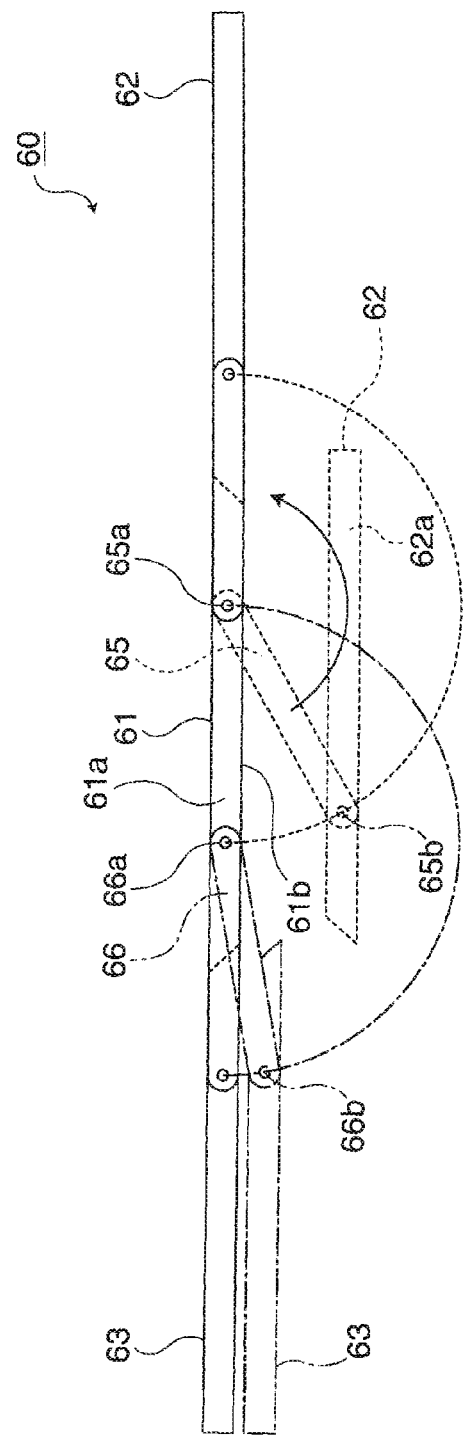
FIG. 6 is a modification of a method of unfolding a screen in each of the above embodiments.

For example, although each of the above embodiments has been described in conjunction with the case in which the screen is configured such that the second and third screens rotate about the axes P and Q for being unfolded, how to unfold the screen is not limited thereto. For example, a screen 60 as shown in FIG. 6 may be adopted. This screen 60 includes a movable part 65 whose one end 65a is connected to an end race 61a of a first screen 61. This movable part 65 is adapted such that the other end 65b is movable along a locus denoted by a chain line about the one end 65a. Further, an end face 62a of a second screen 62 is connected to the other end 65b of this movable part 65, so that the second screen 62 can be folded onto a surface 61b of the first screen 61 by the movable part 65. Similar to the above configuration, a third screen 63 is also adapted such that the other end 66b is movable along a locus denoted by a one-dot chain line about one end 66a of the movable part 66. This allows the third screen 63 to be folded onto the surface 61b of the first screen 61.

Figure 7:
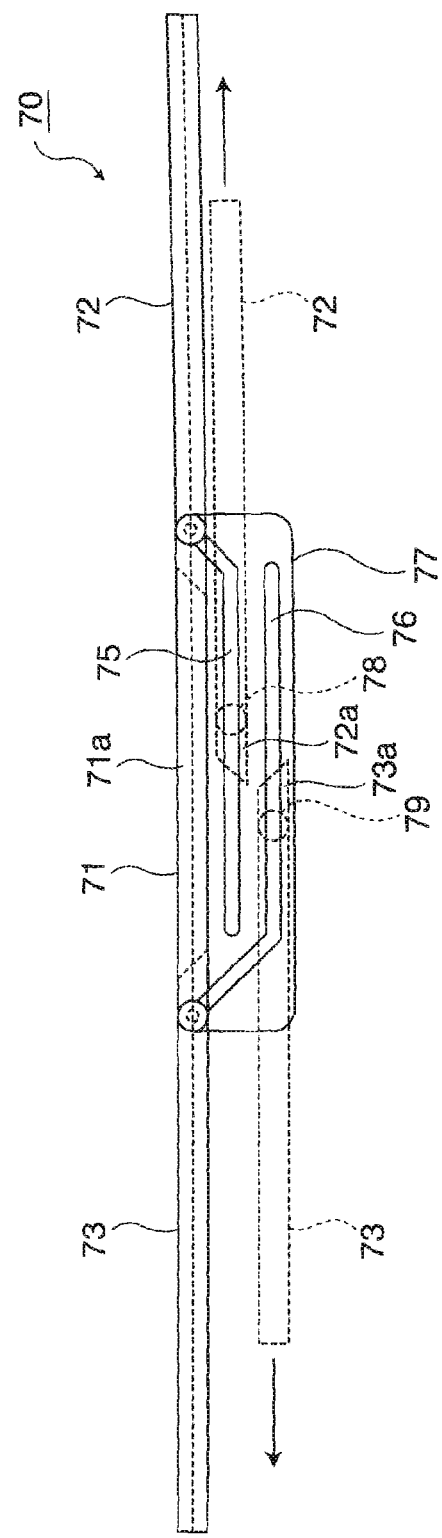
FIG. 7 is a modification of a method of unfolding a screen in each of the above embodiments.

Furthermore, as an alternative way of unfolding a screen, as shown in FIG. 7, a screen 70 which is unfolded in a slidable manner may be adopted. In this screen 70, an end face 71a of a first screen 71 is provided with a guide plate 77 formed with a groove portion 75 which makes a second screen 72 slidable and a groove portion 76 which makes a third screen 73 slidable.

An end face 72a of the second screen 72 and an end face 73a of the third screen 73 are respectively provided with movable members 78 and 79 each having a recessed portion which is movable in the groove portion 75 or 76. This causes the second and third screens 72 and 73 to be sled along the groove portions 75 and 76 by aid of the movable members 78 and 79 so that the screen 70 can be unfolded.

Further, the rear face 13b may be formed into a flat face without providing a plurality of fins in the heat radiating sections 36, 37, and 38. In this configuration, it is also possible to project an image without unfolding the first and second screen 3 and 32 or to project an image, unfolding only the second screen 32 or the third screen 33. At this time, an image projected from the projector lens 14 can also adjusted by the image adjusting section 25 so as to have a size according to the size of the screen 13.

If it is possible to project an image onto the screen 13 even when the screen 13 is not unfolded to the greatest size as such, a projector including an illuminance adjustor which adjusts the illuminance of an image emitted from the image display unit 11 according to the size of the screen 13 detected by the detecting section 20 may be used. In this configuration, if the detecting section 20 detects that the screen 13 is not unfolded when an image is projected by the image display unit 11, an image on whose illuminance is dropped will be projected onto the screen 13. As such, the illuminance of an image automatically can be reduced when the screen 13 is small. Since this can reduce the electric power of the projector body 12 when the screen 13 is not unfolded, it is possible to achieve power saving.

Further, although the image adjusting section 25 is provided so that an image projected from the projector lens 14 can be adjusted automatically to have the size of the screen 13, the projector body 12 may be provided with a manually adjustable image adjusting section.

Furthermore, the refrigerant may be either gas or liquid. By using in particular a liquid as the refrigerant, the generated heat can be carried efficiently and thus the cooling efficiency can be ensured sufficiently.

Further, a heat pipe which carries the heat generated in the protector body 12 to the heat radiating sections 36, 37, and 38 or the frame 52 may be provided in the refrigerant flow passage 41. In this configuration, the heat generated in the projector body 12 is carried to the heat radiating sections 36, 37, and 38 or the frame 52 by the heat pipe in the refrigerant flow passage 41. Accordingly, although a pump is required in a case where heat is carried using a refrigerant, such a pump can be omitted by using the heat pipe. Therefore, it is possible to reduce the size and cost of the whole apparatus.

The entire disclosure of Japanese Patent Application No. 2005-308287, file Oct. 24, 2006 is expressly incorporated by reference herein.

What is claimed is:

1. A projector comprising:
    a projector body which has an image display unit which displays an image;
    a screen member onto which an image emitted from the image display unit is to be projected;
    a detector which detects a size of the screen member;
    an illuminance adjustor which adjusts the illuminance of the image emitted from the image display unit according to the size of the screen member as detected by the detector; and
    a connecting part capable of holding the screen member and the projector body at a predetermined distance therebetween and capable of accommodating the screen member within the projector body,
    wherein the screen member can be unfolded in an in-plane direction.

2. The projector according to claim 1, further comprising an image adjustor which adjusts the size of the image emitted from the image display unit according to the size of the screen member as detected by the detector.

3. The projector according to claim 1,
    wherein the screen member is provided with a heat radiating section which radiates heat generated in the projector body.

4. The projector according to claim 3,
    wherein a refrigerant flow passage through which a refrigerant can be circulated is formed inside the connecting part, and the refrigerant flow passage is connected with the heat radiating section.

5. The projector according to claim 4,
    wherein the refrigerant is a liquid, and the liquid carries the heat generated in the projector body to the heat radiating section.

6. The projector according to claim 4,
    wherein a heat pipe which carries the heat generated in the projector body to the heat radiating section is provided within the refrigerant flow passage.

\* \* \* \* \*